(12) United States Patent
Rudek et al.

(10) Patent No.: US 10,762,213 B2
(45) Date of Patent: Sep. 1, 2020

(54) DATABASE SYSTEM THREAT DETECTION

(71) Applicant: INTERNATIONAL BUSINESS MACHINES CORPORATION, Armonk, NY (US)

(72) Inventors: Krzysztof Rudek, Nowy Wisnicz (PL); Grzegorz P. Szczepanik, Cracow (PL); Lukasz Jakub Palus, Cracow (PL); Tomasz Hanusiak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/168,994

(22) Filed: Oct. 24, 2018

(65) Prior Publication Data
US 2020/0134187 A1    Apr. 30, 2020

(51) Int. Cl.
*G06F 21/00* (2013.01)
*G06F 21/57* (2013.01)
(Continued)

(52) U.S. Cl.
CPC .......... *G06F 21/577* (2013.01); *G06F 16/252* (2019.01); *G06F 21/604* (2013.01); *G06F 21/6281* (2013.01); *G06F 21/78* (2013.01)

(58) Field of Classification Search
CPC ...... G06F 21/78; G06F 21/577; G06F 21/604; G06F 21/6281; G06F 16/252
See application file for complete search history.

(56) References Cited

U.S. PATENT DOCUMENTS

| 6,735,701 B1* | 5/2004 | Jacobson | H04L 29/06 726/1 |
| 2013/0226662 A1* | 8/2013 | LeVine | G06Q 10/10 705/7.32 |

(Continued)

FOREIGN PATENT DOCUMENTS

| WO | 20171585421 A1 | 1/2017 |
| WO | 20180450671 A1 | 1/2018 |

OTHER PUBLICATIONS

Forcepoint; GDPR Compliance Solution: retrieved from the Internet; https://www.forcepoint.com/solutions/need/eu-general-data-protection-regulation-gdpr; 9 pages.
(Continued)

*Primary Examiner* — Beemnet W Dada
(74) *Attorney, Agent, or Firm* — Schmeiser, Olsen & Watts; Stephanie Carusillo

(57) ABSTRACT

A method and system for improving memory storage and threat detection is provided. The method includes requesting and authorizing permission for executing analysis code for determining if a service device is in compliance with general data protection regulations. In response, executable code is uploaded to the database hardware controller and a first database and a second database is analyzed with respect to patterns associated with the general data protection regulations. Associated results code is generated and transmitted the service device. The results code is executed with respect to the first database and the second database resulting in a storage space increase in the first database and the second database thereby improving operational functions of the first database and the second database.

20 Claims, 6 Drawing Sheets

(51) Int. Cl.
*G06F 16/25* (2019.01)
*G06F 21/60* (2013.01)
*G06F 21/62* (2013.01)
*G06F 21/78* (2013.01)

(56) References Cited

U.S. PATENT DOCUMENTS

| | | | |
|---|---|---|---|
| 2015/0067761 A1* | 3/2015 | Bade | H04L 63/20 |
| | | | 726/1 |
| 2016/0275116 A1* | 9/2016 | Shi | G06F 8/77 |
| 2017/0123668 A1* | 5/2017 | Kim | H04N 19/44 |
| 2017/0206376 A1 | 7/2017 | Sher-Jan | |

OTHER PUBLICATIONS

Fortinet; Preparing for the General Data Protection Regulation (GDPR); retrieved from the Internet; https://www.fortinet.com/content/dam/fortinet/assets/white-papers/preparing-general-data-protection-regulation.pdf; 8 pages.

* cited by examiner

DATABASE SYSTEM THREAT DETECTION

FIELD

The present invention relates generally to a method for determining hardware system compliance and in particular to a method and associated system for improving hardware and software based database storage technology associated with increasing memory storage and preventing threat detection.

BACKGROUND

Accurately enabling storage systems for devices typically includes an inaccurate process with little flexibility. Determining operational solutions with respect to system integrity may include a complicated process that may be time consuming and require a large amount of resources. Accordingly, there exists a need in the art to overcome at least some of the deficiencies and limitations described herein above.

SUMMARY

A first aspect of the invention provides a memory storage and threat detection improvement method comprising: receiving, by a processor of a database hardware controller from a Web user interface, a request for determining if a service device is in compliance with general data protection regulations; requesting, by the processor, permission for executing analysis code for determining if the service device is in compliance with the general data protection regulations; authorizing, by the processor, the permission; uploading to the database hardware controller, by the processor in response to the authorizing, executable software code; analyzing, by the processor executing the executable software code, a first database and a second database with respect to the service device and user and patterns associated with the general data protection regulations; generating, by the processor based on results of the analyzing, results code; transmitting, by the processor via an application programming interface, the results code to the service device; and executing, by the processor, the results code with respect to the first database and the second database resulting in a storage space increase in the first database and the second database thereby improving operational functions of the first database and the second database.

A second aspect of the invention provides a computer program product, comprising a computer readable hardware storage device storing a computer readable program code, the computer readable program code comprising an algorithm that when executed by a processor of a database hardware controller implements a memory storage and threat detection improvement method, the method comprising: receiving, by the processor from a Web user interface, a request for determining if a service device is in compliance with general data protection regulations; requesting, by the processor, permission for executing analysis code for determining if the service device is in compliance with the general data protection regulations; authorizing, by the processor, the permission; uploading to the database hardware controller, by the processor in response to the authorizing, executable software code; analyzing, by the processor executing the executable software code, a first database and a second database with respect to the service device and user and patterns associated with the general data protection regulations; generating, by the processor based on results of the analyzing, results code; transmitting, by the processor via an application programming interface, the results code to the service device; and executing, by the processor, the results code with respect to the first database and the second database resulting in a storage space increase in the first database and the second database thereby improving operational functions of the first database and the second database.

A third aspect of the invention provides a database hardware controller comprising a processor coupled to a computer-readable memory unit, the memory unit comprising instructions that when executed by the computer processor implements a memory storage and threat detection improvement method comprising: receiving, by the processor from a Web user interface, a request for determining if a service device is in compliance with general data protection regulations; requesting, by the processor, permission for executing analysis code for determining if the service device is in compliance with the general data protection regulations; authorizing, by the processor, the permission; uploading to the database hardware controller, by the processor in response to the authorizing, executable software code; analyzing, by the processor executing the executable software code, a first database and a second database with respect to the service device and user and patterns associated with the general data protection regulations; generating, by the processor based on results of the analyzing, results code; transmitting, by the processor via an application programming interface, the results code to the service device; and executing, by the processor, the results code with respect to the first database and the second database resulting in a storage space increase in the first database and the second database thereby improving operational functions of the first database and the second database.

The present invention advantageously provides a simple method and associated system capable of accurately enabling storage systems for devices.

DETAILED DESCRIPTION

Figure 1:
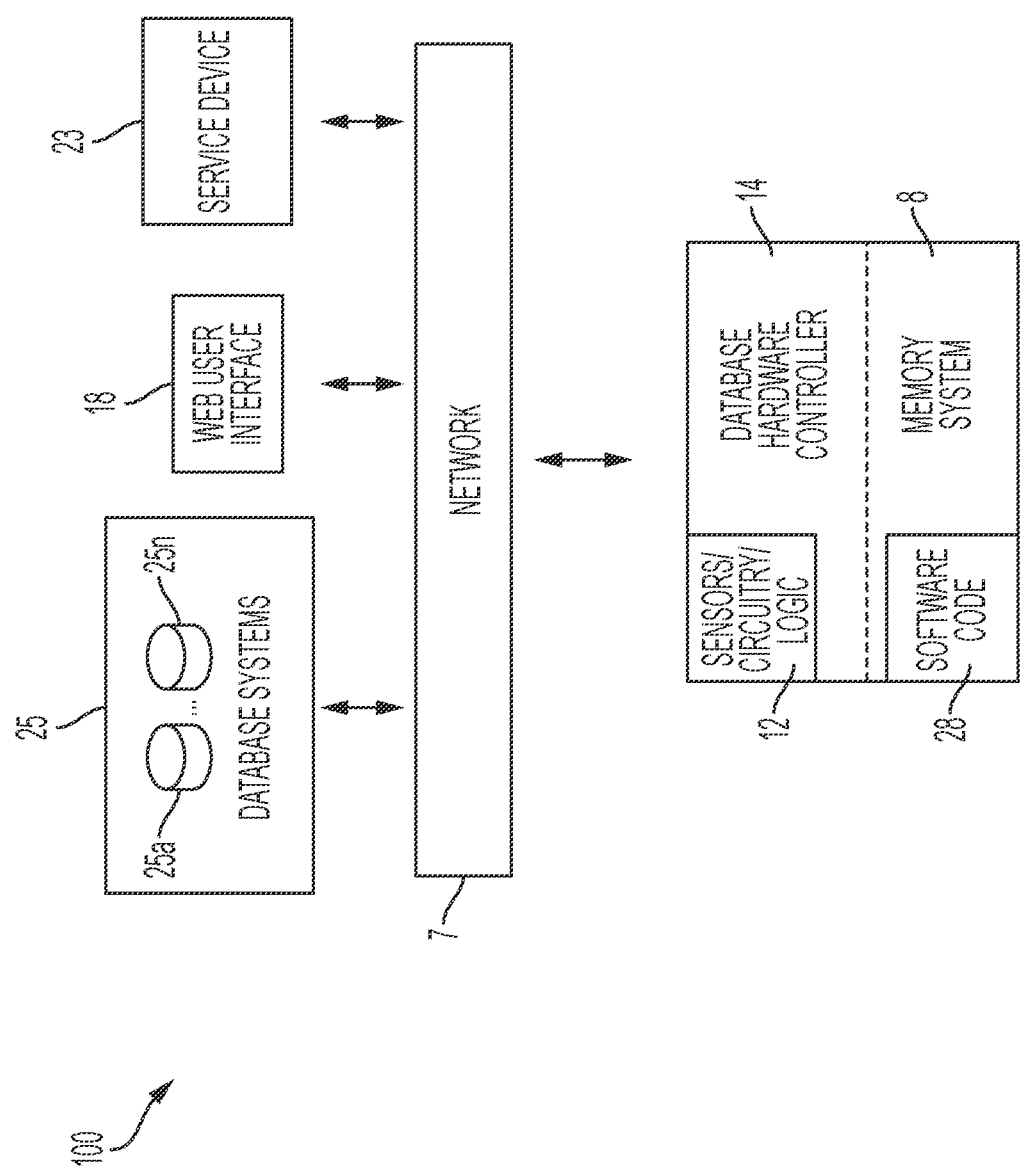
FIG. 1 illustrates a system for improving hardware and software based database storage technology associated with increasing memory storage and preventing threat detection, in accordance with embodiments of the present invention.

FIG. 1 illustrates a system 100 for improving hardware and software-based database storage technology associated with increasing memory storage and preventing threat detection, in accordance with embodiments of the present invention. System 100 is enabled to search for potential general data protection regulation (GDPR) and malicious code (viral) threats and notify users prior to executing corrective actions thereby diagnosing potential system threats. System 100 enables the following functionality with respect to database operations:

System 100 comprises (knowledge) databases 25a . . . 25n. A first database of databases 25a . . . 25n includes information describing user policies and user groups within various database systems. The first database is configured to specify databases used by a given system with respect to user permissions. A second database of databases 25a . . . 25n is configured to store patterns associated with saving information subject to GDPR rules. Therefore system 100 comprises hardware and software configured to generate an interface for querying a Website for information associated with possible scenarios for deleting data entered by a user. Likewise, system 100 generates information associated with possible scenarios for violating GDPR rules.

System enables the following components: a first central repository of knowledge, a second central repository of knowledge, an application programming interface (API), and a detection mechanism. The first central repository comprises data associated with users and groups within various database systems. The second central knowledge repository comprises data associated with storing sensitive data. The API monitors data entered into a Web based interface (e.g., a form) with respect to GDPR rules. If the data is determined to be sensitive, the Web based interface determines compliance with GDPR rules. The detection mechanism verifies defined users and user groups and determines if GDPR rules may be at risk.

System 100 of FIG. 1 includes a database hardware controller 14, database systems 25, a user Web interface 18, and a service device 23 interconnected through a network 7. Database hardware controller 14 comprises sensors/circuitry/logic 12 and a (specialized) memory system 8 (and a specialized GUI). Memory system 8 comprises software code 28 including executable code. Memory system 8 may include a single memory system. Alternatively, memory system 8 may include a plurality of memory systems. Database hardware controller 14, database systems 25, user Web interface 18, and service device 23 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, database hardware controller 14, database systems 25, user Web interface 18, and service device 23 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving hardware and software-based database storage technology associated with increasing memory storage and preventing threat detection. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following process for detecting GDPR compliance of a target system:

The process is initiated a data deletion check request for a target system is received from a user via a GUI. In response, an executable program is transmitted to the target system for execution resulting in a query being executed with respect to an operating system of the target system for determining a database type. The query results are used to detect a first database (including policy information user group information) and a second database (including patterns of data subject to GDPR rules). The first databased in configured to execute a check to locate unusual and common data patterns on the target system. Any usual patterns located are used for determining a GDPR violation. Likewise, any unusual data patterns located are used for reconstructing underlying data. Additionally, a verification process is executed (via the first database) to locate usual data patterns in the underlying data for determining a GDPR violation. A GDPR violation may be used for calculating a GDPR compliance probability value and generating correction code and an associated report.

System 100 enables the following implementation example for detecting GDPR compliance of a target system. The process is initiated when a user A verifies if a Service XYZ (e.g. xyz.service.com) allows him/her to delete personal data. The user accesses a service (e.g., checkA.com) and waits for response. In response, the target system receives associated information from a web user interface specifying if service XYZ is in line with GDPR restrictions. Therefore, the target system communicates with the service XYZ for requesting permission to perform an analysis via an API executing HTTP GET and HTTP POST code. If service XYZ accepts terms of service (checkA.com), a .jar file/program (e.g., a .sh script executable program) may be downloaded to the XYZ service. The downloaded .jar file/program performs an associated analysis via usage of two knowledge databases. An associated connection is established via HTTP and uses a representational state transfer (REST) API with respect to the knowledge databases. An analysis report may be generated as an XML or JSON file and transmitted to service (checkA.com) via usage of a REST API.

Figure 2:
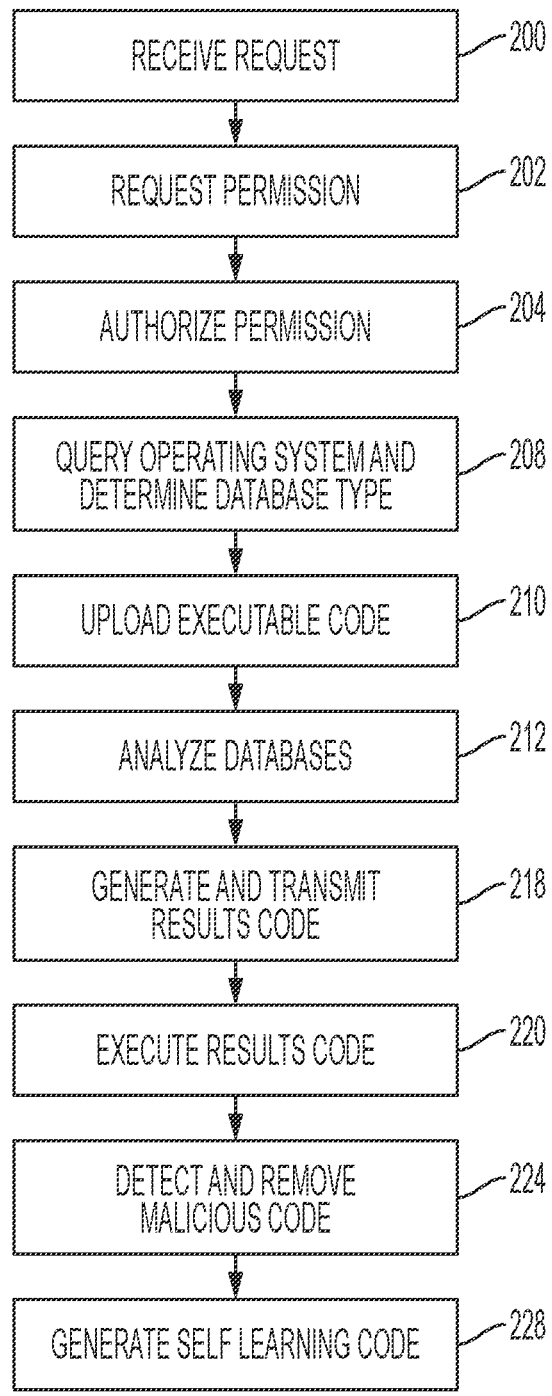
FIG. 2 illustrates an algorithm detailing a process flow enabled by the system of FIG. 1 for improving hardware and software based database storage technology associated with increasing memory storage and preventing threat detection, in accordance with embodiments of the present invention.

FIG. 2 illustrates an algorithm detailing a process flow enabled by system 100 of FIG. 1 for improving hardware and software-based database storage technology associated with increasing memory storage and preventing threat detection, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by database hardware controller 14, database systems 25, user Web interface 18, and service device 23 of FIG. 1. In step 200, a user accessing specified network content is detected. In step 202, a request for determining if a service device is in compliance with general data protection regulations is received by a database hardware controller from a Web user interface. In step 202, permission for executing analysis code for determining if the service device is in compliance with the general data protection regulations is requested. In step 204, the permission is authorized. In step 208, an operating system of the service device is queried and database types for a first database (e.g., comprising policy data and group data associated with a user) and a second database (e.g., comprising code representing patterns associated with the general data protection regulations) are determined. In step 210, executable software code (e.g., XML code, JSON code, etc.) is uploaded to the database hardware controller in response to the authorizing of step 204. In step 212, the first database and the second database are analyzed (via execution of the executable software code) with respect to the service device and user and patterns associated with the general data protection regulations. The analysis may include: detecting defective code patterns within the service device; determining a violation associated with the general data protection regulations; and reconstructing the second database.

In step 218, results code is generated based on results of the analysis of step 212. The results code is transmitted (via an application programming interface) to the service device. In step 220, the results code is executed with respect to the first database and the second database resulting in a storage space increase in the first database and the second database thereby improving operational functions of the first database and the second database. In step 224, it may be determined (in response to executing the results code) that malicious code has infiltrated the database hardware controller. In response, the malicious code is removed from the database hardware controller thereby increasing an operational speed of the database hardware controller and improving an operation of the database hardware controller. In step 228, self learning software code is generated for executing future processes associated with increasing storage space of the first database and the second database.

Figure 3:
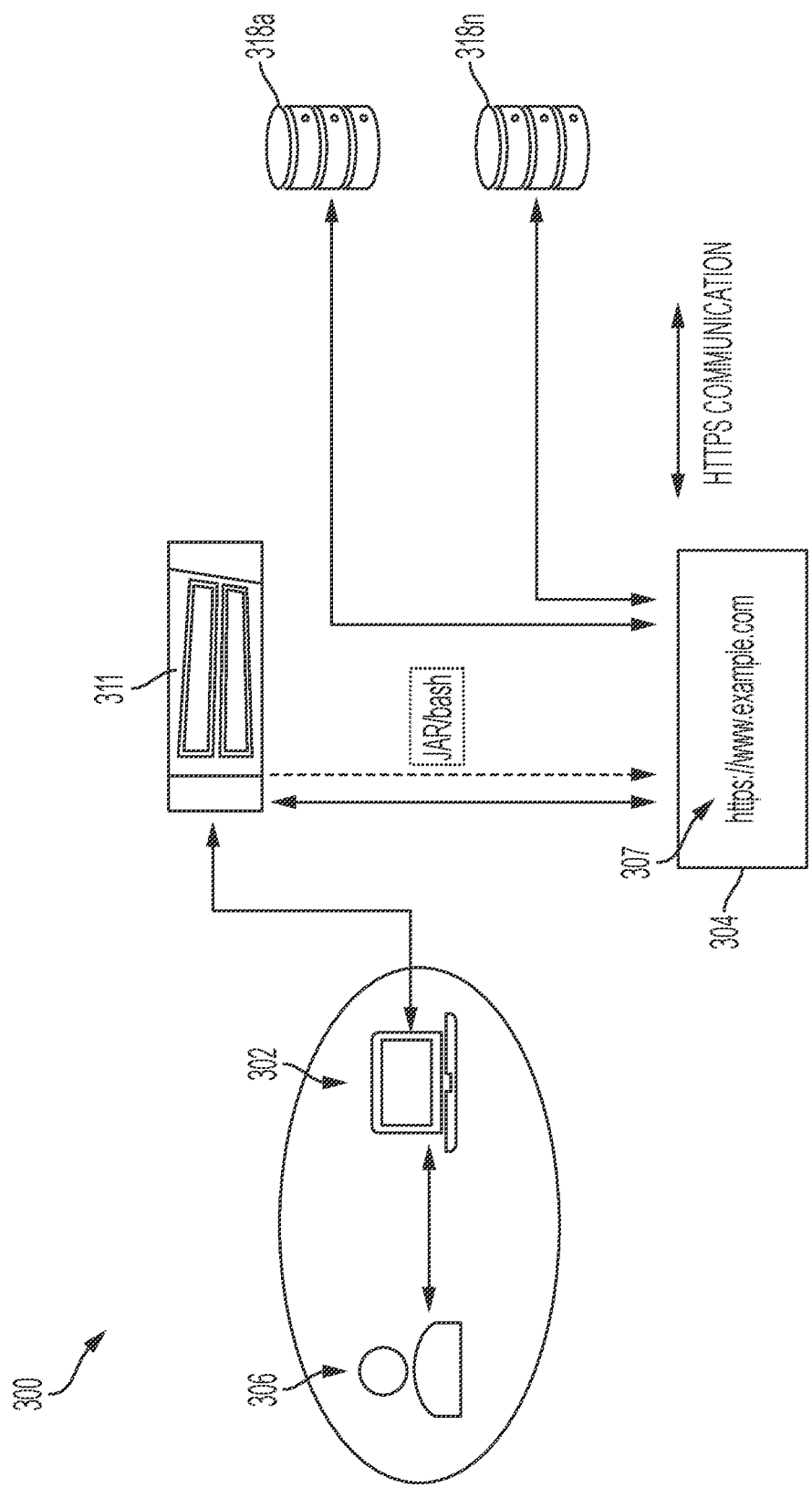
FIG. 3 illustrates an implementation example enabled by the system of FIG. 1 for improving hardware and software-based database storage technology, in accordance with embodiments of the present invention.

FIG. 3 illustrates an implementation example enabled by system 100 of FIG. 1 for improving hardware and software-based database storage technology, in accordance with embodiments of the present invention. The example presented in FIG. 3 is initiated in response to a database system receiving information from Web user interface. The information comprises a request for determining if a service XYZ (e.g., a service hardware device and/or software) is in compliance with GDPR restrictions. In response, the system communicates with the service XYZ. The communication includes a request for: information associated with determining if the service XYZ is in compliance with GDPR restriction and permission for performing an associated analysis if the service XYZ accepts service terms. In response, an executable program (e.g., .jar/.sh script, etc.) is downloaded to the XYZ service. The downloaded executable program executes an analysis process using two knowledge bases. Additionally, an analysis report is generated as an XML or JSON file and transmitted to the service XYZ via a REST API.

Figure 4:
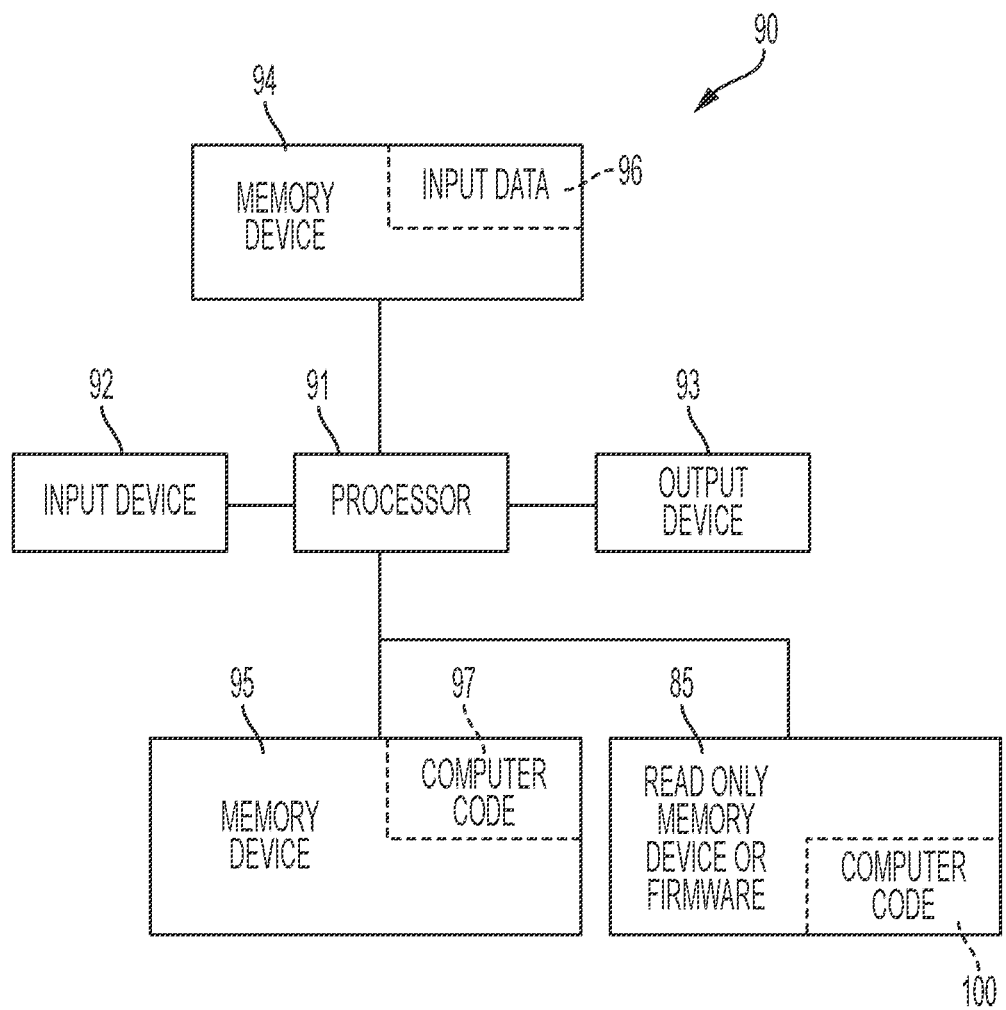
FIG. 4 illustrates a computer system used by the system of FIG. 1 for improving hardware and software-based database storage technology associated with increasing memory storage and preventing threat detection, in accordance with embodiments of the present invention.

FIG. 4 illustrates a computer system 90 (e.g., server system 23, database systems 25, and external systems 27, and hardware device 14 of FIG. 1) used by or comprised by the system of FIG. 1 for improving hardware and software-based database storage technology associated with increasing memory storage and preventing threat detection, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving hardware and software based database storage technology associated with increasing memory storage and preventing threat detection. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware and software based database storage technology associated with increasing memory storage and preventing threat detection. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware and software based database storage technology associated with increasing memory storage and preventing threat detection. In another embodiment, the invention provides a business method that performs the process steps of the invention on a subscription, advertising, and/or fee basis. That is, a service supplier, such as a Solution Integrator, could offer to enable a process for improving hardware and software based database storage technology associated with increasing memory storage and preventing threat detection. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
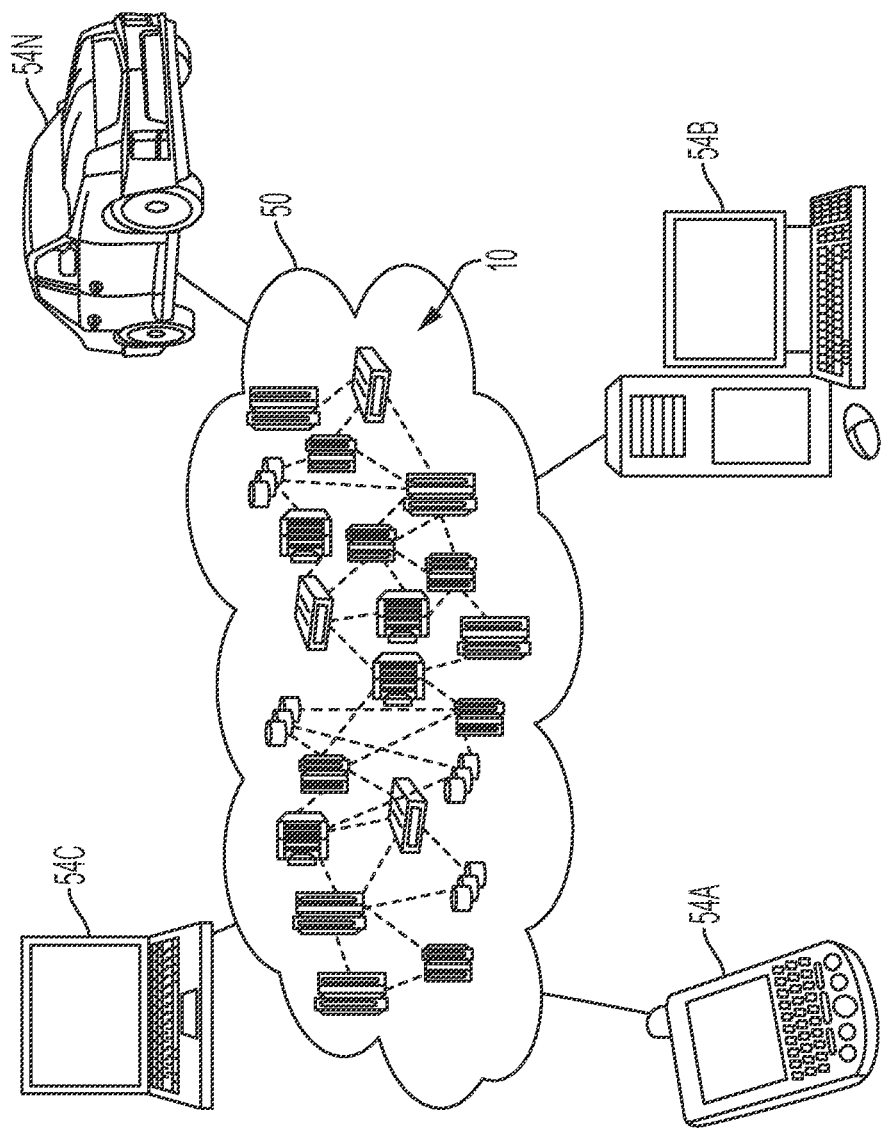
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
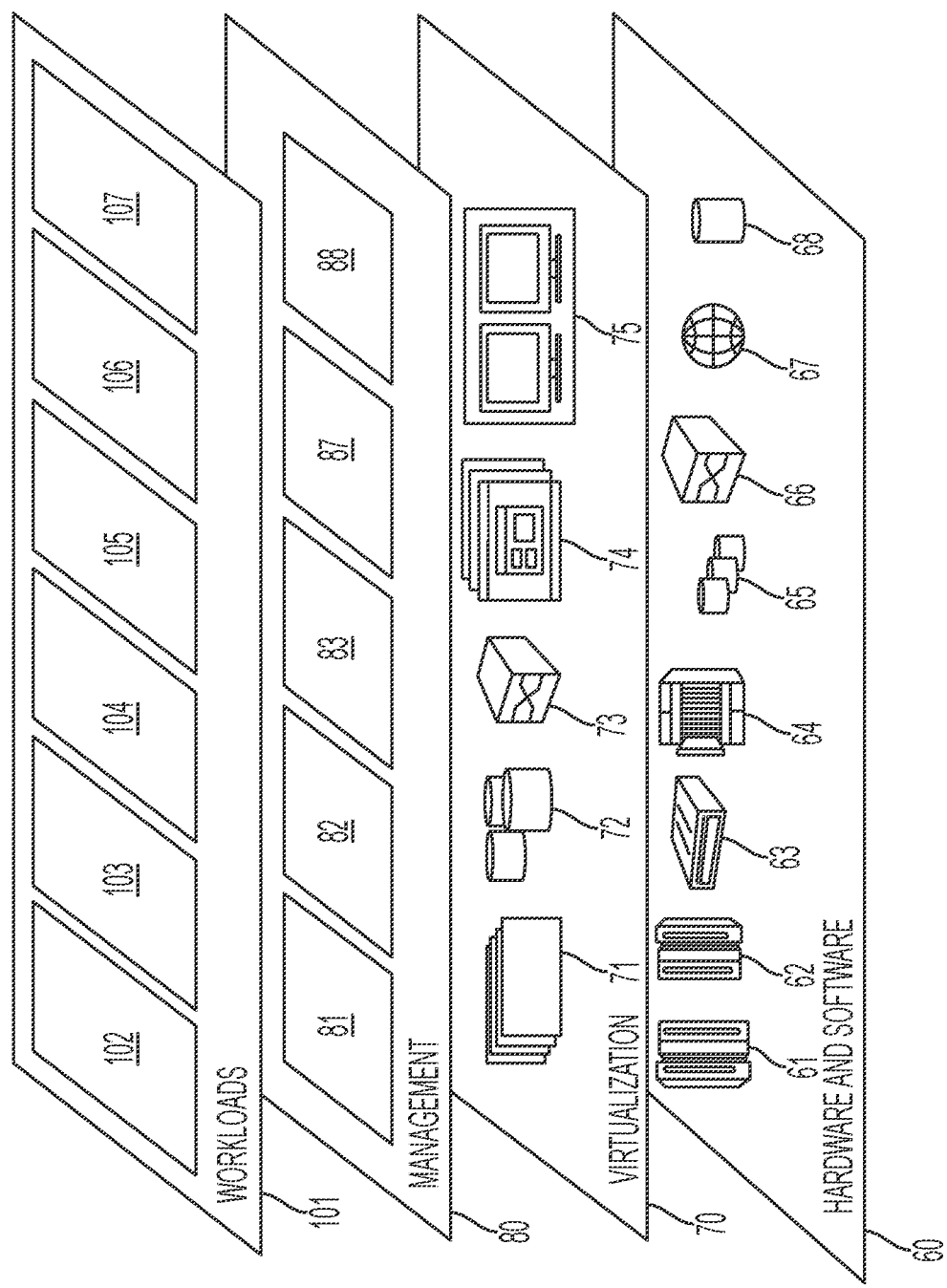
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving hardware and software based database storage technology associated with increasing memory storage and preventing threat detection 108.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A memory storage and threat detection improvement method comprising:
   receiving, by a processor of a database hardware controller from a Web user interface, a request for determining if a service device is in compliance with general data protection regulations;
   requesting, by the processor, permission for executing analysis code for determining if said service device is in compliance with said general data protection regulations;
   authorizing, by said processor, said permission;
   uploading to said database hardware controller, by said processor in response to said authorizing, executable software code;
   analyzing, by said processor executing said executable software code, a first database and a second database with respect to said service device and user and patterns associated with said general data protection regulations;
   generating, by said processor based on results of said analyzing, results code;
   transmitting, by said processor via an application programming interface, said results code to said service device; and
   executing, by said processor, said results code with respect to said first database and said second database resulting in a storage space increase in said first database and said second database thereby improving operational functions of said first database and said second database.

2. The method of claim 1, wherein said first database comprises policy data and group data associated with a user.

3. The method of claim 1, wherein said second database comprises code representing patterns associated with said general data protection regulations.

4. The method of claim 1, wherein said analyzing comprises:
   detecting defective code patterns within said service device;
   determining a violation associated with said general data protection regulations; and
   reconstructing said second database.

5. The method of claim 1, further comprising:
   querying, by said processor, an operating system of said service device; and
   determining database types for said first database and said second database, wherein said analyzing is executed with respect to said database types.

6. The method of claim 1, wherein said executable code comprises XML code or JSON code.

7. The method of claim 1, further comprising:
   generating, by said processor, self learning software code for executing future processes associated with increasing storage space of said first database and said second database.

8. The method of claim 1, further comprising:
   determining, by said processor in response to said executing said results code, that malicious code has infiltrated said database hardware controller; and
   removing, by said processor executing said results code, said malicious code from said database hardware controller thereby increasing an operational speed of said database hardware controller and improving an operation of said database hardware controller.

9. The method of claim 1, further comprising:
   providing at least one support service for at least one of creating, integrating, hosting, maintaining, and deploying computer-readable code in the control hardware, said code being executed by the computer processor to implement: said receiving, said requesting, said authorizing, said uploading, said analyzing, said generating, said transmitting, and said executing.

10. A computer program product, comprising a computer readable hardware storage device storing a computer readable program code, said computer readable program code comprising an algorithm that when executed by a processor of a database hardware controller implements a memory storage and threat detection improvement method, said method comprising:

receiving, by said processor from a Web user interface, a request for determining if a service device is in compliance with general data protection regulations;

requesting, by said processor, permission for executing analysis code for determining if said service device is in compliance with said general data protection regulations;

authorizing, by said processor, said permission;

uploading to said database hardware controller, by said processor in response to said authorizing, executable software code;

analyzing, by said processor executing said executable software code, a first database and a second database with respect to said service device and user and patterns associated with said general data protection regulations;

generating, by said processor based on results of said analyzing, results code;

transmitting, by said processor via an application programming interface, said results code to said service device; and executing, by said processor, said results code with respect to said first database and said second database resulting in a storage space increase in said first database and said second database thereby improving operational functions of said first database and said second database.

11. The computer program product of claim 10, wherein said first database comprises policy data and group data associated with a user.

12. The computer program product of claim 10, wherein said second database comprises code representing patterns associated with said general data protection regulations.

13. The computer program product of claim 10, wherein said analyzing comprises:

detecting defective code patterns within said service device;

determining a violation associated with said general data protection regulations; and reconstructing said second database.

14. The computer program product of claim 10, further comprising:

querying, by said processor, an operating system of said service device; and determining database types for said first database and said second database, wherein said analyzing is executed with respect to said database types.

15. The computer program product of claim 10, wherein said executable code comprises XML code or JSON code.

16. The computer program product of claim 10, wherein said method further comprises:

generating, by said processor, self learning software code for executing future processes associated with increasing storage space of said first database and said second database.

17. The computer program product of claim 10, wherein said method further comprises:

determining, by said processor in response to said executing said results code, that malicious code has infiltrated said database hardware controller; and removing, by said processor executing said results code, said malicious code from said database hardware controller thereby increasing an operational speed of said database hardware controller and improving an operation of said database hardware controller.

18. A database hardware controller comprising a processor coupled to a computer-readable memory unit, said memory unit comprising instructions that when executed by the computer processor implements a memory storage and threat detection improvement method comprising:

receiving, by said processor from a Web user interface, a request for determining if a service device is in compliance with general data protection regulations;

requesting, by said processor, permission for executing analysis code for determining if said service device is in compliance with said general data protection regulations;

authorizing, by said processor, said permission;

uploading to said database hardware controller, by said processor in response to said authorizing, executable software code;

analyzing, by said processor executing said executable software code, a first database and a second database with respect to said service device and user and patterns associated with said general data protection regulations;

generating, by said processor based on results of said analyzing, results code;

transmitting, by said processor via an application programming interface, said results code to said service device; and executing, by said processor, said results code with respect to said first database and said second database resulting in a storage space increase in said first database and said second database thereby improving operational functions of said first database and said second database.

19. The database hardware controller of claim 18, wherein said first database comprises policy data and group data associated with a user.

20. The database hardware controller of claim 18, wherein said second database comprises code representing patterns associated with said general data protection regulations.

* * * * *